United States Patent
Massaro

(10) Patent No.: US 6,550,673 B2
(45) Date of Patent: Apr. 22, 2003

(54) ELECTRONIC DISPLAY FOR STORE SHELVES

(76) Inventor: Michael J. Massaro, 329 Bradford La., Lansdale, PA (US) 19446

( * ) Notice: Subject to any disclaimer, the term of this patent is extended or adjusted under 35 U.S.C. 154(b) by 31 days.

(21) Appl. No.: 09/892,451

(22) Filed: Jun. 28, 2001

(65) Prior Publication Data

US 2002/0034067 A1 Mar. 21, 2002

Related U.S. Application Data

(63) Continuation-in-part of application No. 09/664,711, filed on Sep. 19, 2000.

(51) Int. Cl.[7] .......................... G06K 15/00; G06K 7/06; G06F 17/60
(52) U.S. Cl. .................... 235/383; 235/385; 235/441
(58) Field of Search .............................. 235/383, 385, 235/441

(56) References Cited

U.S. PATENT DOCUMENTS 5,680,442 A * 10/1997 Bartholomew et al. ....... 379/67

* cited by examiner

Primary Examiner—Karl D. Frech
Assistant Examiner—Daniel A. Hess
(74) Attorney, Agent, or Firm—Gregory J. Gore

(57) ABSTRACT

A system for electronically displaying sales item data such as price and item description on store shelves utilizes a central store microprocessor/computer to control the display system. Standard shelf display tags are replaced by an electronic display device and display bus system. The display bus system is comprised of a printed circuit board, with conductors which run parallel so that electrical contact can readily be made by a display module which is mounted to the printed circuit board. All of the store shelf edge channels are installed with a printed circuit board electronic bus system. In an alternate embodiment a fully integrated display strip is substituted for individual display modules. A central controller processes information from a store computer signal and sends the information to the display modules or display strips using a specialized signal format comprised of a series of tones with frequencies less than 10,000 khz. Item descriptions, sales prices, sales alerts, regular prices, and per unit quantity prices can all be added or changed via a central store computer.

17 Claims, 11 Drawing Sheets

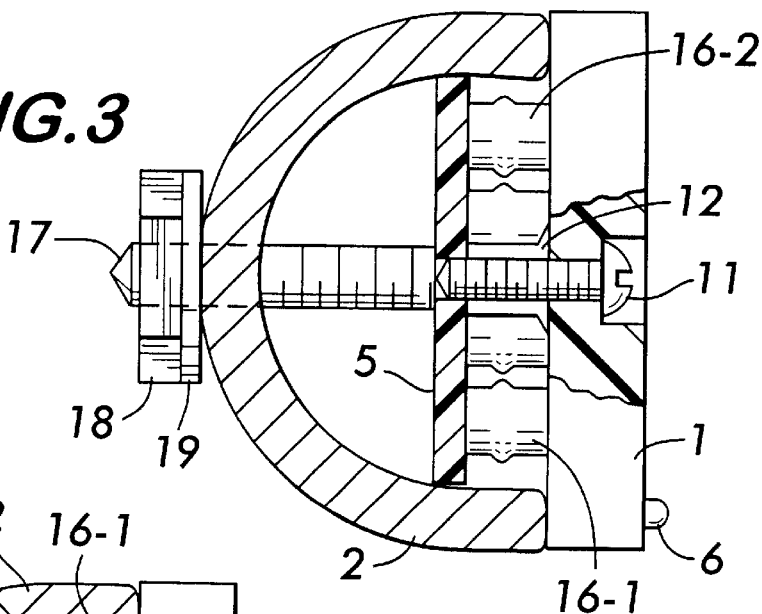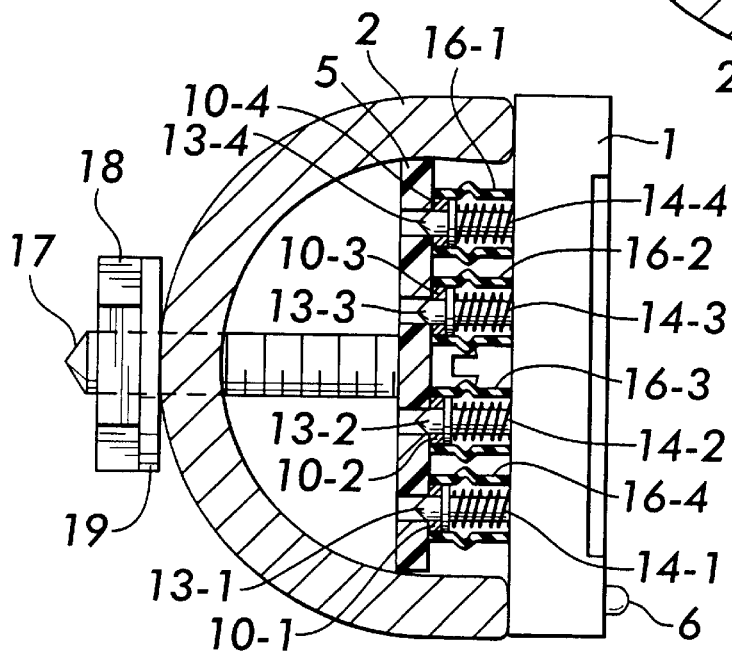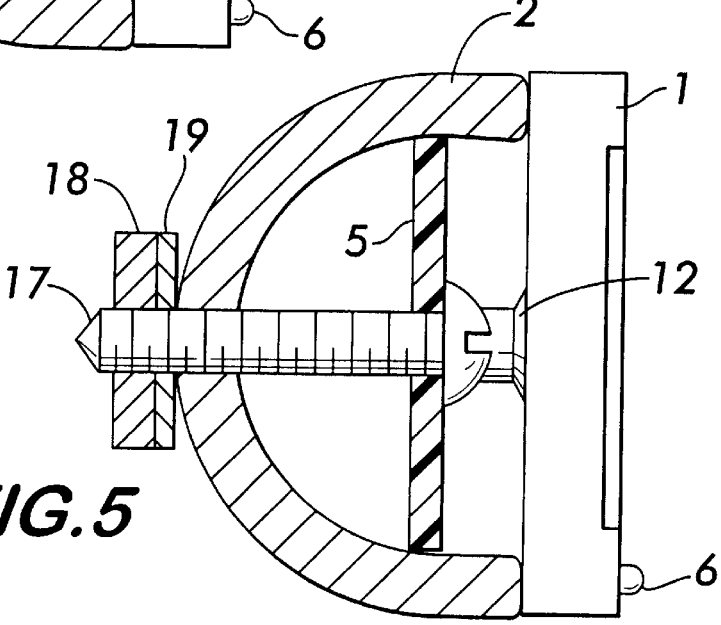

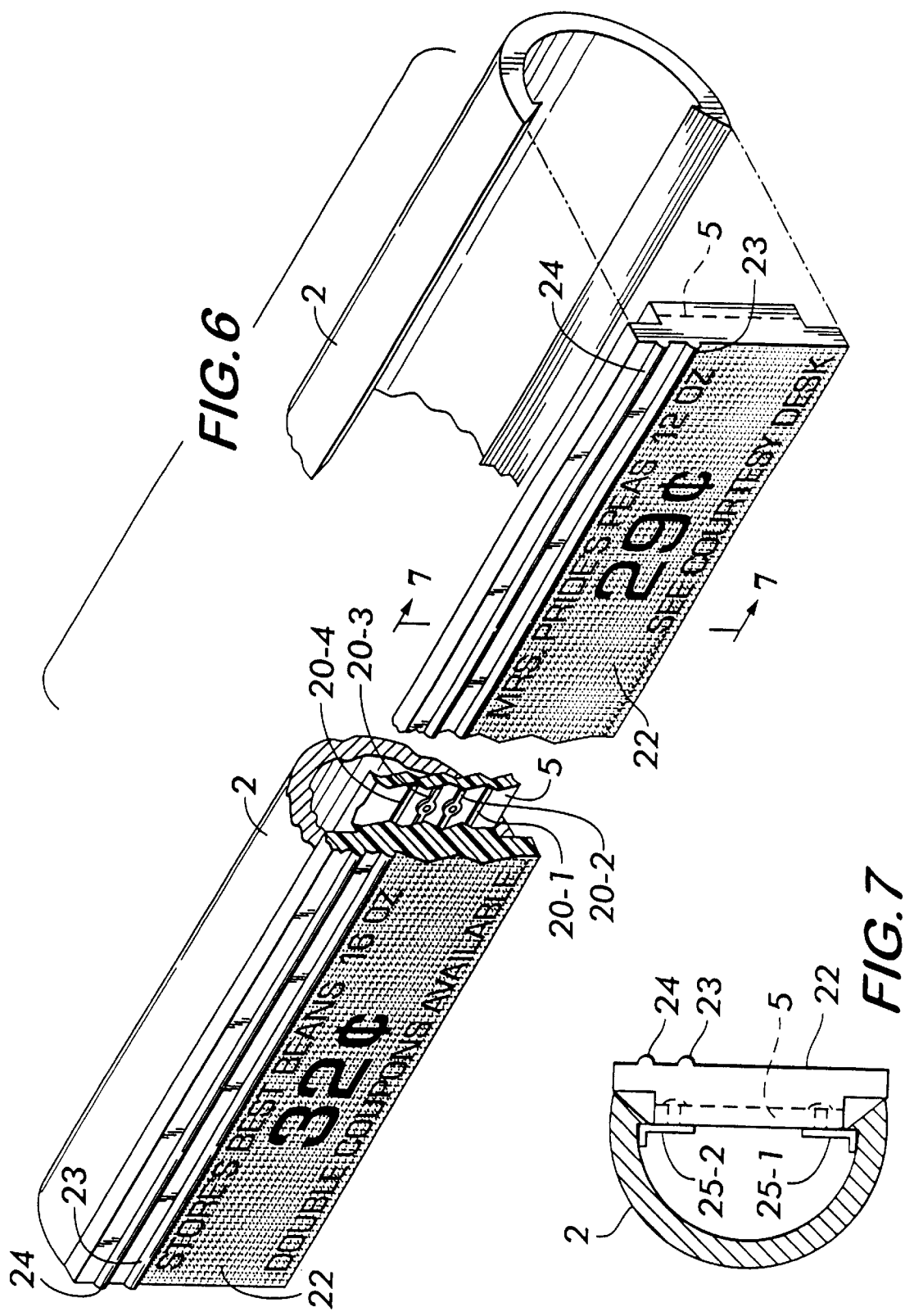

ELECTRONIC DISPLAY FOR STORE SHELVES

RELATED APPLICATIONS

This patent application is a continuation-in-part of co-pending patent application Ser. No. 09/664,711 filed Sep. 19, 2000 for "Electronic Display for Store Shelves," priority from which is hereby claimed.

FIELD OF THE INVENTION

The present invention relates to the electronic storage, control, and display of information on a shelf-mounted price tag. More specifically, it relates to electronic price displays which communicate with a central store computer and point of sale computers.

BACKGROUND OF THE INVENTION

A large supermarket may have as many as thirty-five thousand different items for sale. The items are generally arranged on shelves. Price tags are generally disposed below the items on the front of the shelves that are providing the support for the items. Most store shelves have an edge channel into which the tags are placed. The tags are generally passive, that is; they are prepared in advance and are affixed to the front of the shelves inside of the shelf edge channel. The tags may be made from a suitable material such as cardboard or plastic and may be affixed to the shelves in a manner such that they can be easily removed from the shelves. The information on the tags may be typed or printed. This information may include the identity of the item, the supplier's or the stores trademark for the item, the price of the item, the price per unit quantity (e.g. price per ounce or price per fluid unit or price per pound), any discount from a previously established price, or a special sales price.

It has been estimated that approximately 10% of the prices of a store's inventory are changed weekly to reflect cost variations. Perhaps another 10% of the prices may be changed so as to reflect sales specials, and then changed back again when the sale event is terminated. For the most part, such price changes are effected on overtime, or at least when the store is closed to normal business. Further, since auditing a price ordinarily must be accomplished with the aid of a printed book, it is next to impossible to maintain computer prices (the scanned prices) synchronous with book prices.

It is not uncommon to change the price of an item in the central processing unit in the market and to forget to change the price on the tag identifying the item on the store shelf. This creates confusion, particularly at the cashier's counter, in the operation of the supermarket and sometimes resentment in the minds of the customers. Often the supermarket may have to provide the customer with the price indicated on the tag even though the true price indicated in the supermarket's central processing unit is higher than such indicated price.

Passive tags on shelves as discussed above have vast acceptance because of their apparent low cost and because of their widespread use over a considerable number of years. The apparent low cost, however, must be factored against the labor costs associated with the preparation of the new tags and the costs in removing the outdated tags from the shelves, and in affixing the updated tags to the shelves. For large supermarkets, the services of a clerk on a full time basis are often required to accomplish the above tasks.

Various attempts have been made to replace the passive system to updating tags as discussed above with an active system. In these active systems there has been a computer-based means of changing pricing information and electronic display means or electronic product tag, which are computer controlled. Some systems have used a wireless radio frequency (RF) broadcast medium, for at least part of the communications link between the point-of-sale, the store computer, and the electronic display units on the shelves. Other wireless media have included infrared broadcast or handheld infrared transmitting devices. In all cases, the display device itself has either been powered by battery or by use of photovoltaic cells (solar cells).

Many such systems are described in the prior art. U.S. Pat. No. 4,766,295, dated Aug. 23, 1988, describes the use of battery operated display tags and wireless control of the tags. The tags respond to remotely transmitted signals from overhead transmitters using infrared energy. A hand held unit using the same signaling structure can be used to change price tags manually. The hand held unit can also receive address information and the like from the electronic tag. U.S. Pat. No. 5,465,085, dated Nov. 7, 1995, presents the use of wireless, remotely controlled electronic product display tags that are powered by Photovoltaic cells (solar cells). The tags are controlled by wireless means using overhead infrared transmitters to up-date or change displayed information.

U.S. Pat. No. 4,002,886, dated Jan. 11, 1977, describes the use of electronic display modules that are directly connected to the store main computer and every display unit in the store has its own separate internal address code. The means of connecting the computer to the display tags is by the use of a separate enclosed bus strip that is affixed to every shelf edge.

U.S. Pat. No. 4,139,149, dated Feb. 13, 1979, presents a system in which the electronic display tags do not have an internal address code. The display modules are connected directly to the central store computer and all units are in series with each other. The computer transmits a continuous serial data stream to all of the display units. The computer sends signals conveying the data for each display unit in the same order as the display units are connected to each other.

U.S. Pat. No. 5,374,815, dated Dec. 20, 1994, shows the use of display modules without the need for internal address codes. Display modules are directly connected to a computer. Modules are located by the computer using a zoning system in combination with an electrical contact system along the length of the display bus, which is attached to the shelf edge. In response to a poll from the central computer for determining any displacement of the label, the latter generates a signal indicative of the combination of terminals electrically connected to the interface. Based on this signal and knowledge of the pattern of the electrical contacts along the interface, the central computer can effectively determine the location of the label on the rail and detect any displacement of same. A separate electronic display bus is needed for every four-foot shelf section at the most and for every vertical layer of shelf for all store shelf rows at the least.

U.S. Pat. No. 5,111,196, dated May 5, 1992, presents electronic display tag units that are battery powered. A portable, hand-held device is used to reprogram and change the displayed information in each tag. The means for affecting the change is by having the hand-held device make direct electrical contact with the display tag. The portable data terminal is electrically connected to the display module by a multi-terminal connector, whereby electrical contact pins of the connector are aligned for engagement with respective electrical contact strips located at the face of the display module and connected to the memory thereof.

In U.S. Pat. No. 4,500,880, dated Feb. 19, 1985, the display module is hardwired to the store-based computer, and the computer provides both power and associated data. Each display module has an internal address code. The address code of any of the display units can be changed at its location by the use of a hand-held reprogramming device. The display unit is placed in the hand-held device and its address is changed by using the optical scanner in the fixture to scan the bar code (UPC) of the item of merchandise to which the display unit is to be associated.

U.S. Pat. No. 5,751,257, dated May 12, 1998, describes an electronic tag display system in which the display units are isolated and independent and have neither solar cells nor batteries as a direct power source. The display modules receive power and programming by sweeping a hand-held portable device or "wand" across the distributed contacts of the electronic shelf tag. The hand held programming device makes direct electrical contact with the electronic shelf tag and provides the information to be displayed.

In U.S. Pat. No. 5,537,312, dated Jul. 16, 1996, the entire length of a shelf edge is an electronic display system and it is an integral part of the shelf. The "rack label" display system is centrally and directly connected to and controlled by a computer. All repositioning of the electronic rack labels is performed electronically via the central computer and not physically repositioned like the other systems described herein. A display status table is prepared for every product on every shelf and includes the physical size of the product item on the shelf The computer calculates the position to display the product information based on the display status table. The rack label system is designed to only receive display information.

In U.S. Pat. No. 4,521,677 dated Jun. 4, 1985, the entire length of the shelf edge is an electronic display system with the display in defined segments. The display can be hard-wired to the store computer or connected by a wireless transmission means. The shelves for the various items are provided with respective bar codes equipped with individual electronic displays that are linked to the computer such that the displayed information is in part coordinated with the bar code of the respective items stored on the particular shelf The display elements are designed to only receive display information.

In U.S. Pat. No. 4,438,432 dated Mar. 20, 1984, a multiplexed display system is described in which all information to be displayed is multiplexed onto a data distribution system that is hard-wired connected to all display locations. Each display module is microprocessor controlled and each has its own address code. Each module displays a single alphanumeric message and is designed to only receive display information.

Finally, U.S. Pat. Nos. 5,854,476 and 5,854,475, both dated Dec. 29, 1998, describe an electronic price label (EPL) system in which the electronic display tag is battery operated. Control and programming information is sent by the EPL computer using a wireless transmission means.

Battery-powered solutions offer more operational flexibility because displays may be more randomly placed. However, batteries must periodically be replaced, an objectionable and time-consuming task in a store that may have tens of thousands of batter powered displays. Display units powered by solar cells avoid this problem. However, they cannot be used in store shelf areas with low background light levels. Also, the solar cells may not provide sufficient output power to the display unit during periods of heavy power consumption such as during sales alert signaling.

For systems in which radio waves are used, an FCC license must be obtained for each installation, causing delays in installation. In addition, frequency allocations are becoming difficult to obtain.

For systems using broadcast infrared energy, there have been problems establishing line-of-sight linkage between the sources of the infrared energy and the tags energized by such sources. For example, the infrared sources have generally been overhead, usually at the ceilings of the supermarkets. As a result, there has often been a considerable distance between the infrared sources and the tags, particularly with respect to the tags on the lower shelves. Furthermore, there has been a problem with respect to the line-of-sight linkage between the infrared sources and the tags on the shelves, particularly the tags on the lower shelves. These problems have required high-powered infrared sources to be used and bright responses from the tags to be provided. When batteries have been used to power the tags in such systems that employ infrared energy, the batteries have had short lives in view of the intensity of the infrared energy required. Also, display units powered by solar cells may not provide sufficient power to operate under the above conditions. These disadvantages can be overcome by the use of a handheld infrared transmitting device or a hand-held device that makes direct electrical contact for the purpose of reprogramming the displayed information. However, this has the disadvantage of being time consuming and labor intensive. As such, each display module to be changed must be physically located and accessed and then reprogrammed by the hand-held transmitting device.

For those active display systems in which the entire length of the shelf edge has an electronic display, precise positioning of the display to correspond to the product item located above or below it can be very time consuming and complex. In addition, full-length displays are costly and very power consumptive and cannot be readily adapted to direct battery power or indirect powering means such as with the use of solar cells. The displays in most of these systems are not interactive with the main display computer, thereby further complicating the initial display information set-up. In addition, there is no interaction with the display computer to determine display unit status or accuracy of the displayed information.

For hard-wired powered systems in which the display module is directly connected to a PC workstation, the cable may have to contain both the power lines and the signal lines used to control the display. To accommodate the needed wires, an extra channel is attached to the existing shelf edge channel. This increases the shelf size making the display more susceptible to damage and increases the complexity of the installation. It also creates operational risks in that many liquids in a store are conductive. Thus a spill can create a short circuit and hence cause a system failure. This arrangement also is inflexible because the electronic displays may only be used where the extra channel is installed and power is available.

Another disadvantage of these active display systems is that the display modules may be microprocessor based and may have high clock rates for operation greater than 10 kHz. In addition, the store computer that they are directly connected to also has high clock rates for processing. In such a system, the digital display modules and the interconnection system to the computer can be classified as computer peripheral devices. As such, the display system connected to the computer, and connection means must meet the Part 15 FCC requirements for computer devices. A further disadvantage of some of these embodiments is the need for every display module in the store to have its independent internal address code. This leads to complicated and complex display devices and thousands of different codes are needed to ensure that every product in the store has its individual address code. Some embodiments require the active participation or interaction of store customers with the display module in order to change the information being displayed. The means for this approach is the use of a switch on the display module that the customer activates to change the displayed information.

As will be seen, the active system described herein advances the state of the prior art and overcomes all or most of the above disadvantages.

SUMMARY OF THE INVENTION

This invention provides a system which overcomes the problems associated with the prior art systems briefly described above and advances the state of the art in store display technology.

The invention provides a system for electronically displaying item data, such as price and item description, for purchaser viewing, wherein the data is available in updateable form from the store main computer via a specially designed electronic display server (herein after referred to as a BUSM). This new system is a modern electronic system in which microprocessor/computer based elements control the display system. The standard shelf display tags are replaced by an electronic display device and display bus system. This display bus system is comprised of a printed circuit board, standard type or flex type, with conductors which run parallel so that electrical contact can be readily made by a display module which is mounted to the printed circuit board. The printed circuit board can be easily and rapidly inserted or fastened into the existing shelf edge channels of standard store shelf sections. This can be accomplished by the use of spring clips, screw adjustable clips, or by standard fasteners. All of the store shelf edge channels are installed with a printed circuit board electronic bus system.

The display device in one embodiment of the invention is a self-contained unit, such as a module, which can be installed on the printed circuit board bus system and has a means to make contact with the data and power bus conductors. The electronic bus provides power, data information and remote control of the display module. The display module contains the electronic means to display product information such as prices unit cost quantities, store information such as the store name or owner, a visual alert means such as a flashing light (LED) to indicate that the particular item is on sale, and sales information such as the special sales price, cost savings, and expiration date of sale. The module also has means to store information in the event of a power failure. Each module has the electronic means to have a data bus code or internal address code that is unique to it and only when server information is preceded with its particular address code will the unit respond to the information server and accept the new store display information.

An alternative display system is the use of a fully integrated display strip that is the full length of a standard store shelf edge or shelf section (about 4' long) and the display view is distributed along the entire strip. Such a system can be composed of the newer Organic Light Emitting Device (OLED) technology and such a system eliminates the need for individual display modules for each sales item. Continuous, multicolor displays can be fabricated on laminated sheets of plastic. OLED's consume more power than conventional LCD's but somewhat less that standard LED's and, as such, are suitable for hardwired display applications such as the present embodiment. The use of a multicolor display allows the use of different colors to display different types of information. For example, regular pricing information can be one color and special sales prices can be a second color and so on. The printed circuit board and printed circuit board bus as described previously is also a part of this integrated display strip and can be as easily installed in a shelf edge channel as described previously. The display strip and the printed circuit board bus are a fully integrated and complete assembly. The display strip has the same length and width as the shelf edge. The information to be displayed can be located anywhere across the display strip. The display strip has its own address code much as the display module discussed above.

A printed circuit board bus is installed in every shelf edge channel in the store and all of the printed circuit board electronic buses that have been installed in the shelf edge channels are interconnected. All of the shelves on one entire side of a row of shelves are connected together forming one group or segment of the electronic bus distribution system designated as a display bus. Each side of all of the rows of shelves are electrically and electronically independent of each other and each side of each row has its own segment or section designation. One electrical bus feeder supplies each side of a row with operating power and information that is independent of all of the other sides of the other rows. Each side of each store row has a dedicated display bus. All sides of all of the rows of the store shelves are in turn connected to an electronic buffer/server/multiplexer, referred to herein as the BUSM unit. The BUSM is then connected to and receives display information from the store central computer. The BUSM processes the store computer signal and sends the information to the display modules or display strips using a specialized signal format. Utilizing the present invention, item descriptions, sales prices, sales alerts, regular prices, and per unit quantity prices can all be added or changed to each display module or display strip via the store computer through the BUSM. This eliminates the need to print product description tags, sales tags, pricing, and store name information.

In the display strip embodiment, the display strip is interactive with the BUSM in determining the boundaries of the different products on the shelf and the location of information to be displayed across the entire face of the display strip. The display strip has a set of photocell detectors or photo sensors, either infrared or optical, and a display locating light system both located and distributed across the top of the strip. Product location and product boundaries on the shelf are determined by manually illuminating that photo sensor which resides directly underneath and opposite the shelf item. A small display light indicator is activated at the photo sensor to indicate that the product has been electronically located. This process is continued for the entire length of the shelf section for all of the products on the shelf section. This information is then sent to the BUSM. The BUSM utilizes this information to determine the location, size, and width of the information to be displayed. The manual illumination of the photo sensor can be achieved by the use of a hand-held, battery operated infrared source similar to consumer electronic remote control systems.

A second alternate display strip embodiment includes the use of a single photo detector sensor that is used to receive and detect optical/infrared signals from a handheld, portable electronic control device and a single indicator light. In this embodiment, the Universal Product Code (UPC or bar-code) of an item in digitized numerical form and the product location information also in digitized numerical form are transmitted by the handheld device to the photo detector sensor of the display strip for those product items to be displayed by the display strip. A single indicator light located on the display strip near the sensor is momentarily activated (flashed) to indicate or to acknowledge the correct and successful reception of the product code and the product location information. In this embodiment, the BUSM is programmed to interrogate or poll the display strips to determine if new product code and product location information has been received by the display strip. The BUSM then commands the display strip to transmit the new product code and product location information to the BUSM. The BUSM then transmits the product pricing and product description information to the display strip that was stored in the BUSM under the address of that UPC. The product location information is processed by the BUSM and used to accurately locate and configure the new display information which is included in the signals sent by the BUSM to the display strip. In this embodiment a floor operator can change the items and the item locations on a store shelf and using a handheld electronic control device can ensure that the BUSM will make the correct corresponding changes to the information displayed on the display strip. In this manner, changes to the information displayed on a display strip can be achieved by a floor operator without the need or intervention of a computer operator at the store computer control center.

It is therefore an object of the present invention to provide a simple, inexpensive, electronic shelf tag with nonvolatile memory that is easily programmable and can display a variety of information while maintaining whatever information is programmed onto it indefinitely until changed by information received from the display server. Another object of the present invention is to provide an electronic tag display system that can be easily installed, inexpensive to operate and one that does not need to meet the strict Part 15 FCC certification requirements of computing devices.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3—is a cross-section taken from FIG. 1 showing the details of the means of attaching the display module to the printed circuit board bus.

FIG. 4—is a cross-section of FIG. 1 showing the means of electrically connecting the terminals of the display module to the printed circuit board bus.

FIG. 5—is a cross-section of FIG. 1 showing one approach to mounting the printed circuit board bus to the shelf edge channel.

FIG. 6—is a top, right front exploded view of a standard store shelf edge channel showing an alternate embodiment that includes an electronic display strip that mounts in the shelf edge channel.

FIG. 7—is a cross-section of FIG. 6 showing the details of the means of attaching the display strip to the shelf edge channel.

DETAILED DESCRIPTION OF THE PREFERRED EMBODIMENT

Figure 1:
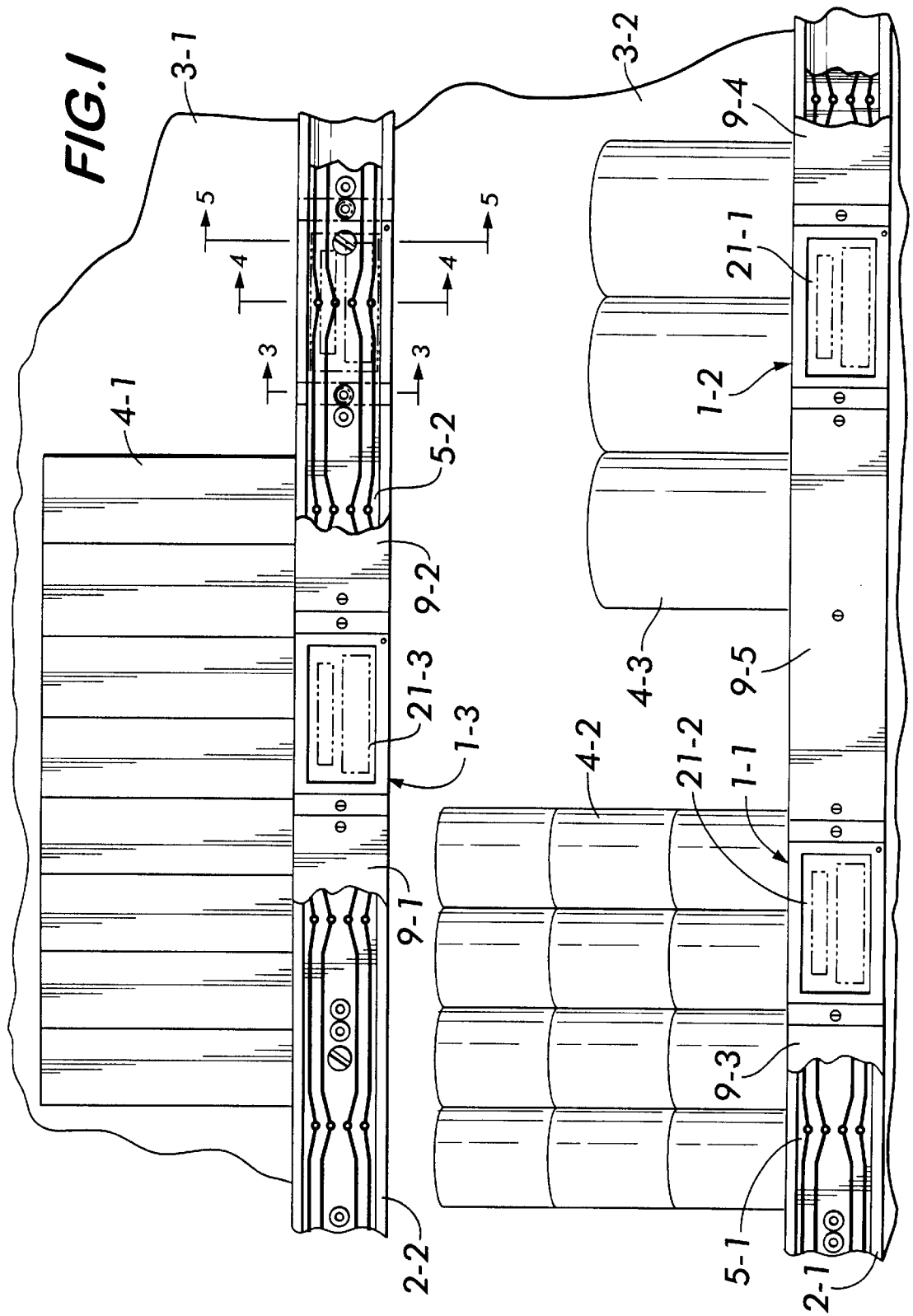
FIG. 1—is the front view of the electronic tag store shelf information display system which forms the present invention.

The independent, stand-alone electronic information display module, which forms part of an embodiment of the present invention, is best described while referring to the drawings. In FIG. 1 there are shown the new electronic display modules mounted in the shelf edge channels 2-1 and 2—2 of store shelf sections 3-1 and 3-2 with dry goods 4-1 and canned goods 4-2 and 4-3. The display modules 1—1, 1-2 and 1-3 are mechanically and electrically connected to printed circuit board buses 5-1 and 5-2.

Each item 4 on each shelf section 3 must have a dedicated display module and each module has its individual internal address code. Because of the uniform spacing of the display modules, preformed blank sections 9-1 to 9-5 can be placed between display modules 1—1, 1-2, and 1-3 and these blank sections can protect and cover the printed circuit board 5 underneath. In this manner, the printed circuit board bus 5 is not exposed to sight or touch by shoppers. The voltages on the printed circuit board bus 5 are less than 30 V DC and are safe in the event of accidental human touch. Display windows 21-1, 21-2 and 21-3 can be used to display pricing information, per unit quantity information, sales price, and sales price saving information. In order to conserve and reduce the amount of display elements needed in the display window, some or all of the information to be displayed can be displayed on a time-shared basis. That is, several parts of the display window information can be displayed in an alternating fashion. One part can be displayed for a fixed length of time and then the second part can be displayed for a fixed length of time with the display window cycling between them. For example, the cost of the item can be displayed alternately with the per unit cost of the item. This can reduce the size of the display module and its cost. Each display can be tilted or adjusted within the enclosure of the display module to allow an optimum viewing angle depending on its location and can be adjusted prior to installation in the shelf section. For example, display module 1—1 mounted on the lower shelf sections 3 can have its display 21-2 adjusted upward. Similarly, display modules mounted on the upper shelf sections can have their display windows adjusted downward.

Figure 2:
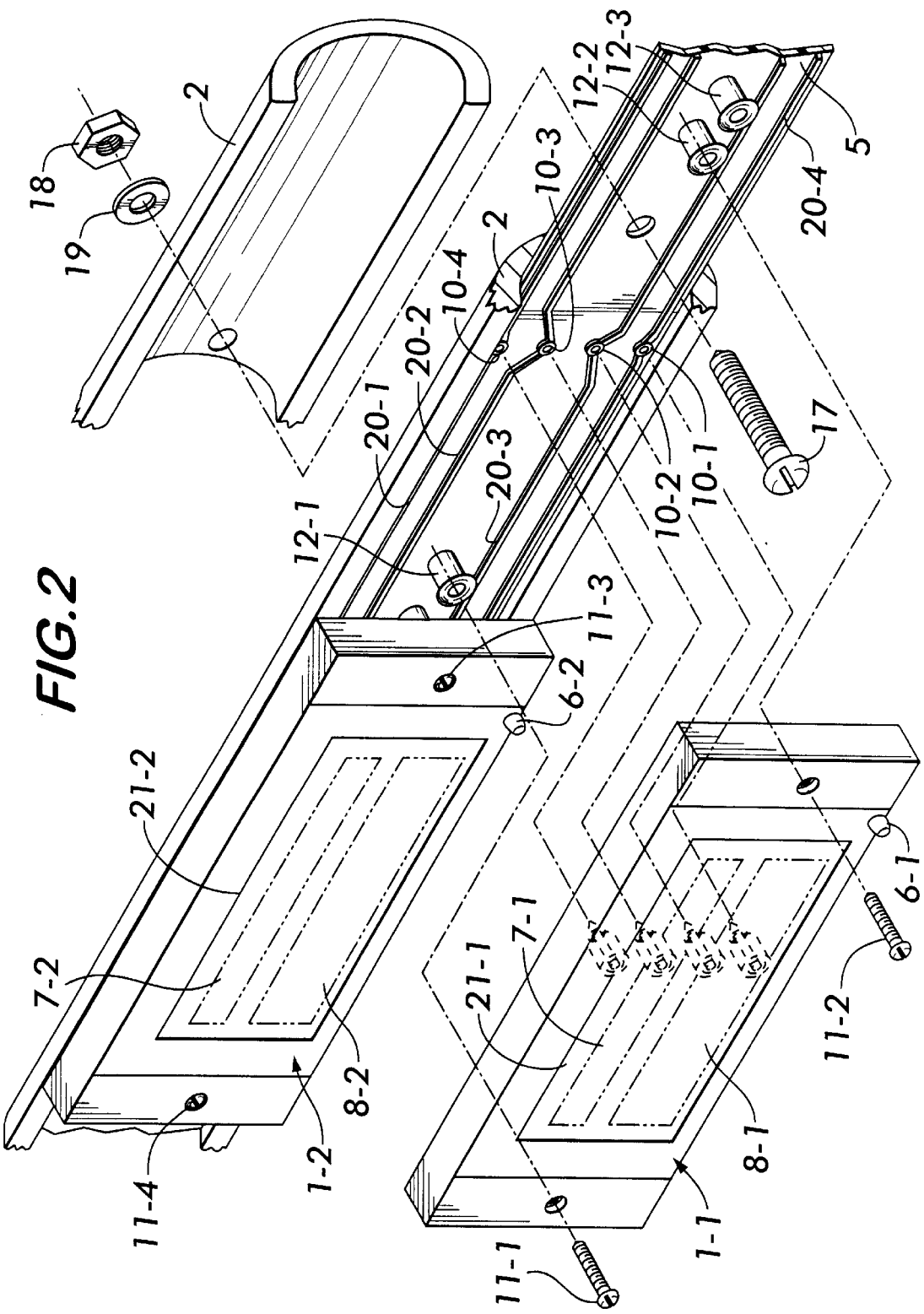
FIG. 2—is a top, right front exploded view of a standard store shelf edge channel showing the electronic display module and the printed circuit board bus that mounts in the shelf edge channel.

FIG. 2 is an isometric exploded view showing the means by which the electronic display module 1—1 or 1-2 is attached to the printed circuit board bus 5 and the means by which the printed circuit board bus 5 is attached to the shelf edge channel 2. The display module 1—1 has a sales alert light 6-1, which can be an LED or similar bright electronic light, to notify customers of a special sales price. Each display window 21-1 or 21-2 has a product description field 7 and a product pricing field 8-1 or 8-2. Also shown is the method by which the display module 1—1 is mounted and electrically connected to the printed circuit board 5 using the conductive pads 10-1 to 10-4 on the board 5. Each module has two mounting screws 11-1 and 11-2, and 11-3 and 11-4 whereby it can be attached to the printed circuit board bus 5 that is mounted in the shelf edge channel 2. The printed circuit board 5 has two threaded mounting sockets 12-1 and 12-2 for each display module attached to it. The sockets are uniformly spaced along the length of the printed circuit board 5. The printed circuit board 5 has several mounting screws 17, nuts 18 and washers that fasten the bus board 5 to the shelf edge channel 2.

In FIG. 2 the printed circuit board 5 has the necessary number of conductive traces 20-1 to 20-4 to carry power and data information to the display modules. The conductive traces can be on the front side (as shown) or the backside of the board 5 and this represents a single-sided board 5. The traces can also be on both sides (double-sided) or imbedded in a layer (multi-layer board). Additionally, the printed circuit board traces can be covered by a non-conductive masking coating which insulates the traces from fluids, which may spill on the printed circuit board 5. One of the objects of this invention is to have a design, which is both simple and low cost. The present design can be achieved with a single-sided board 5. In addition, the printed circuit board bus 5 has mounting sockets 12-1 and 12-2 on the surface to allow the display modules to be easily and rapidly attached and aligned to the circuit board 5. Threaded sockets 12-1 and 12-2 are shown in FIG. 2; however, a small, surface mounted nut-plate (not shown) can also be used. In this case each nut-plate is used to mount a different display module. The nut plate has the advantage of having a low profile (low height) and can be mounted on either side of the printed circuit board 5.

Each display module is about 1.75 to 2.5 inches in length but only about 1.5 inches in height and is positioned on the printed circuit board bus 5 such that its surface perimeter does not extend beyond the existing shelf edge channel 2 either at its top or its bottom. In this manner the display module does not impair or prevent the removal of items from store shelf sections and prevents shelf items from striking and damaging the display module 1 when such items are removed. The standard shelf edge channel 2 for non-refrigerated items runs the length of the shelf section, is about 1.5 inches in height and is about four feet in length. On the order of 16 to 30 display modules can be mounted in the shelf edge channel of each shelf section. The actual number of modules is dependent upon the type of shelf edge channel section into which the display modules are mounted and the actual length of the display module. The shelf edge channels 2 of the store shelf sections have a cross-section that is crescent in shape. By this means it can accommodate the price, product and sales information tags.

Referring now to FIGS. 3, 4, and 5, the printed circuit board bus 5 of the electronic display system can be mounted inside the crescent area. A printed circuit board bus section 5 is needed for every shelf section and each module includes sales alert light 6. FIG. 3 is a cross-section of the shelf edge channel 2, the display module 1 and the printed circuit board bus 5 showing the mounting screw 11 fully seated into the dedicated screw socket 12. FIG. 4 is a cross-section of the shelf edge channel 2, the printed board bus 5, and part of the display module 1 showing the display module 1 guide posts 13-1 to 13-4 engaged in the holes in the printed circuit board bus 5. Each display module 1 has guideposts to allow easy mounting into the printed circuit board bus 5. Around each guidepost is a contact spring 14-1 to 14-4, which allows electrical contact to conductive pads 10-1 to 10-4 on the circuit board 5. Each guide post and contact spring has flexible insulating rubber boots 16-1 to 16-4 and surrounding it. The rubber boots protect the conductive pads from shorting-out in those cases in which fluid from broken jars or bottles comes in contact with the display module 1. In FIG. 4 the display module 1 contact springs 14-1 to 14-4 are making electrical connection to the conductive pads 10-1 to 10-4 and the rubber boots 16-1 to 16-4 are compressed and make contact to the printed circuit board 5. FIG. 5 is a cross-section of the shelf edge channel 2 and the printed circuit board bus 5 showing the mounting screw 17 fastened into the channel 2 by the nut 18 and washer 19.

Different types of shelf edge channels (not shown) are used in freezer or cooler shelf sections of stores (not shown). All have grooves to accommodate tags and a similar mounting approach as described above can be used in these different types of channels.

An alternate approach to electrically attaching the display module to the printed circuit board bus 5 is to use standard connector sockets and pins (not shown). The display module can have standard connector pins on its back side and printed circuit board can have standard connector sockets on its front side each with the appropriate number of contacts. Electrical contact between them is made by pushing the connector pins of the display module 1 into the connector sockets of the printed circuit board.

An alternate, non-destructive and rapid means of mounting the printed circuit board bus to the shelf edge channel is to use spring clips (not shown) or screw-adjustable solid clips that are attached to the printed circuit board. This method of attachment is shown with regard to the alternate embodiment depicted in FIG. 7. Store shelf edge channels 2 have external grooves or lips to which flexible spring clips can be designed to snap into these grooves and produce a secure connection. Screw-adjustable solid clips have a slot with a securing screw to allow the clip to be raised or lowered into the channel groove (not shown). The securing screw is tightened after adjustment to secure the clip. Different spring clips and screw-adjustable solid clips can be designed for the different types of shelf edge channels 2 that can be encountered in a store.

Referring now to FIG. 6, an alternate embodiment includes display means using a fully integrated display strip 22 that is the full length and exact width of a standard store shelf edge channel 2 is illustrated. In this display system the display is distributed across the expanse of the strip. The display can be in the form of segments or a grid of pixels in which the segments or pixels are selected to form alphanumeric characters. The display information for a particular product can be as wide and long as the face of the display strip 22. As in the case of the display modules, as many as 30 different and independent product information displays are possible. The display strip 22 has a printed circuit board bus 5 with conductor traces 20-1 to 20-4 that has the same function and application as described previously except no display modules 1 are mounted on the display strip 22. Also, the printed circuit board 5 is an imbedded and fully integrated part of the assembly of the display strip 22. The electronic components (not shown) of the display strip 22 are distributed across the printed circuit board of the printed circuit board bus 5. The display strip has a linear photo sensor array strip 23 and a product location indicator display strip 24 above it, both of which are distributed across the full length of the display strip 22. The photo sensor array strip 23 can be composed of photocells, charge-coupled devices or photo detectors (not shown) and these devices can be activated by infrared or optical frequencies. The product location indicator display strip 24 can be part of the display grid of the display strip 22 or an independent set of display lights (not shown). In either case, for each photo sensor in the photo sensor array strip 23 there will be a corresponding display light above it. Both of these strips are used in locating the products on the shelf and to assist in the positioning of the product display information across the display strip 22. This is accomplished by illuminating the photo sensor in the photo sensor array strip 23 that is located directly below and in the center of the product on its associated shelf An alternate product location approach is to illuminate those photo sensors in the photo sensor array strip 23 that are at the physical boundaries of the various products, thereby determining the length of the different products across the shelf section. Either approach can be used to locate the displayed information, to determine the width of the displayed information, and to determine the number of items on the shelf section. Other such product location approaches are also possible with this type of system. A hand-held, battery operated infrared or optical source (not shown) can be used to illuminate and activate the photo sensors and it can be similar to portable remote control systems used in consumer electronics. The number of photo sensors in the photo sensor array strip 23 defines the product location resolution for the displayed product information. For example, if a resolution of 0.25 inches is needed then about 184 photo sensors will be needed across the photo sensor array strip 23 of the display strip 22 (46 inches of useable display space per display strip 22 divided by 0.25 inches). Once a particular photo sensor of the photo sensor array strip 23 is activated its corresponding indicator light will illuminate to indicate that the operation was successful and that the product was electronically located. This information is stored in the random access memory unit, RAM, (designated 58 in FIG. 11) and then sent to the BUSM (designated 39 in FIG. 8) upon command. In this manner, each product on the shelf can be properly located and its displayed information can be correctly aligned with that product. The display strip 22 can also be programmed to send a signal to alert the BUSM (designated 39 in FIG. 8) whenever the illuminated photo sensors in the photo sensor array strip 23 have been changed from their previous settings. This can occur when the products on a particular shelf section have been moved from one location to another.

FIG. 6 illustrates the flexibility and advantages of the display strip 22. In addition to the conventional product description information such as "STORE'S BEST BEANS" and product pricing information such as "32¢", a portion or section of the display strip 22 can be used as a general message board. For example, in FIG. 6, the bottom part of the display across the horizontal expanse of the display strip 22 has the message "DOUBLE COUPONS AVAILABLE SEE COURTESY DESK". Any part of the display strip 22 can be used as a designated section for displaying messages such as product advertising information, special store sales information, or product coupon information. This information can be programmed into the BUSM using its programming port.

FIG. 7 is a cross-section of the shelf edge channel 2 and the integrated display strip 22 showing screw-adjustable clips 25-1 and 25-2 being used as the mounting means. A set of screw adjustable clips 25 can be located at each end of the display strip 22. Interconnection means as described above for the printed circuit board buses 5 also applies to the printed circuit board bus 5 of the display strip 22 described herein.

The second alternate display strip embodiment includes all features and functions of the previously described display strip but without the sensor array strip or product location indicator display strip. In this embodiment there is single photo detector sensor device and a single indicator light located on the front surface of the display strip (not shown) and can be at any location on the display strip. The photo detector sensor can receive coded optical/infrared information signals that are transmitted by a handheld portable electronic control unit. The indicator light is momentarily activated upon the successful reception of the transmitted optical signal as a verification means to the floor operator. The transmitted product/item information signal can be the Universal Product Code (UPC) or product bar-code in digitized numerical form of those items to be displayed by the display strip. The items are those products on the shelf associated with that particular display strip. The transmitted product location information signal can be the digitized numerical distance of the item's location from one of the ends of the display strip. This distance can be determined by the use of an external measuring scale or by a measuring scale (not shown) imbedded on the top surface of the display strip.

The handheld portable electronic control unit (not shown) can have an electrical interface port to allow connection to a handheld portable bar-code reading device (not shown) that is commercially available. In this manner, the portable bar-code reader can be used to scan in the UPC's of the items to be displayed directly into the handheld control unit via a data interface cable (not shown) and is a more efficient alternative to manually entering the UPC into the electronic control unit.

Figure 8:
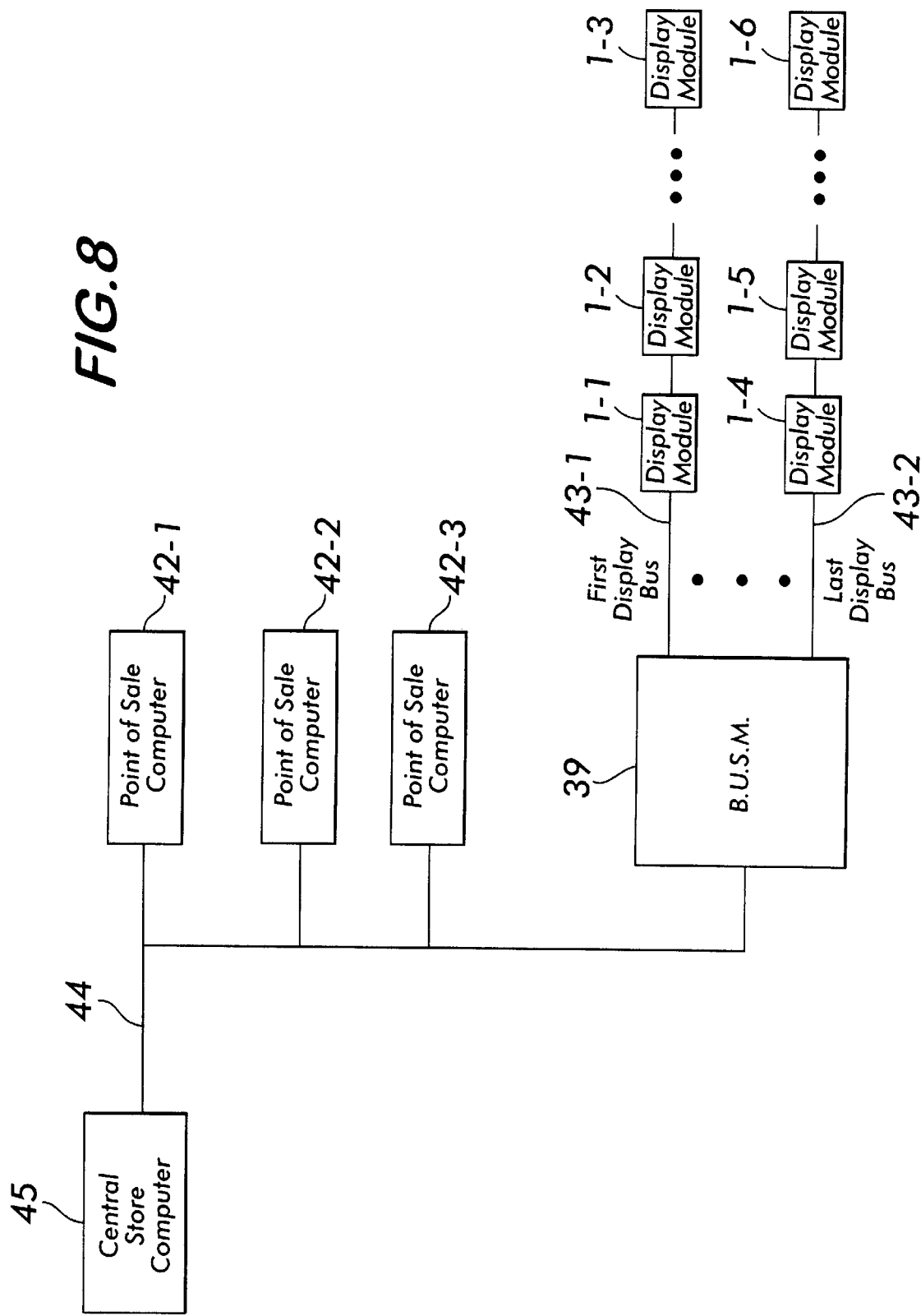
FIG. 8—is a block diagram illustrating the interconnection and information flow between the central store computer, the point of sale computers, the BUSM, the store display buses, and the display modules.

FIG. 8 is a simplified block diagram of the overall new electronic display system and its interfaces with point-of-sale computers 42-1 to 42-3, the display buses 43-1 to 43-2, the store computer bus 44, the standard central store computer 45, and the display modules 1—1 to 1-6. One of the objects of the present invention is to make each electronic display module or display strip as simple electronically as possible which is accomplished with the BUSM 39. The BUSM 39 provides an information exchange link between the high-speed computer bus, serial or parallel, of the store computer and the low speed (less than 10 kHz) signal port (designated 50 in FIG. 10) of the display modules or the low speed signal port of the display strips of the alternate embodiment (designated 50 in FIG. 11). The use of a serial or parallel computer bus by the store computer will affect the type of software needed by the BUSM to allow communications with the store computer. The BUSM 39 accepts the cost, product description, product code (UPC or bar-code)

information in much the same matter as the point-of-sale computers. The BUSM then processes the product information for transmission to the electronic display modules. The BUSM 39 ensures that the product cost information is distributed and sent to the correct display bus 43-1 or 43-2 and to the correct display module which is displaying the information of the intended product. This system is equally applicable to the display strip means of displaying product information. In this case the display strips can be substituted for the display modules.

Figure 9:
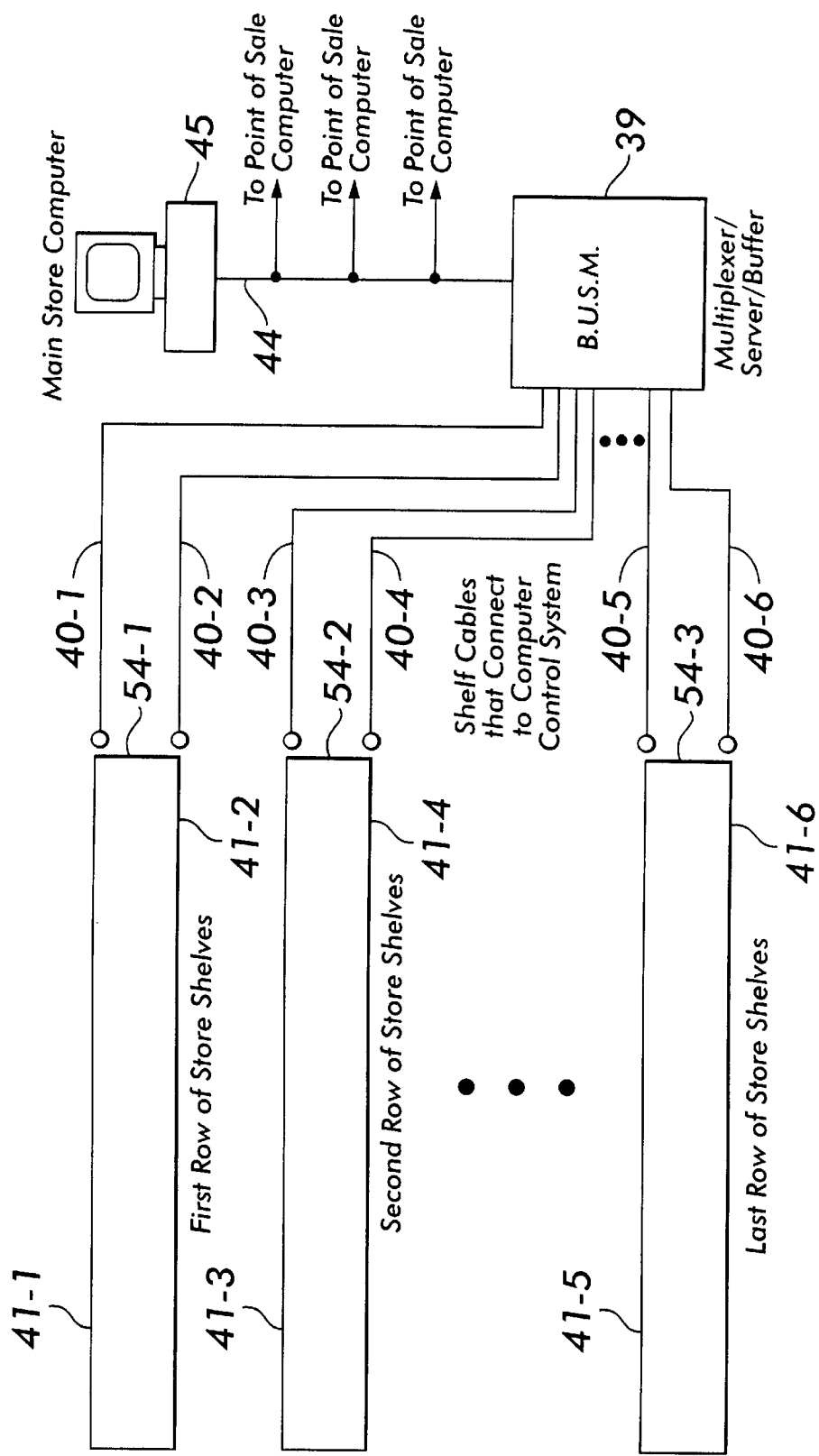
FIG. 9—is a block diagram showing the information flow and electrical interconnection between the BUSM, the main store computer, and the printed circuit board buses in each side of each row of store shelves.

FIG. 9 shows the electrical interconnection between the BUSM 39, the store computer 45, the display bus cables 40-1 to 40-6, and the store shelf rows 54-1 to 54-3, and the sides 41-1 to 41-6 of the rows. The BUSM 39 and a plurality of point of sale computers are connected to the store computer through bus 44. In FIG. 9 there is a display bus cable and a corresponding display bus for each side of all of the rows of store shelves. The various printed circuit boards in each of the shelf edge channels of the various shelf sections on one side 41 of a row 54 can be electrically interconnected by the use of sets of standards connection posts (not shown) on each end of the printed circuit board. The posts or pins (not shown) are electrically connected to the traces of the board and protrude vertically from the board surface. Two sets of pins at each end of the printed circuit board can allow any arrangements of shelf sections to be interconnected. Interconnection is achieved by the use of standard flat ribbon cable (not shown) jumper assemblies. Standard push-in ribbon cable end connectors (not shown) with snap-in locks can be used to secure the ribbon cable connection. The use of a secure connector prevents the jumper cable (not shown) from being disconnected by a casual or accidental contact by a customer. In this manner all of the printed circuit board buses in the shelf sections of an entire side of a row can be connected to the BUSM by one bus cable.

The BUSM 39 unit not only provides DC power to the display units or display strips but also acts as a buffer, server, and multiplexer in that it provides a two way communication link to the various display modules or display strips located in all of the rows 54-1 to 54-3 of the store shelves. The BUSM 39 routes the information or item changes sent by the store computer 45 to the proper display bus group or segment, i.e., the particular shelf row and side 41-1 to 41-6, and to the proper display module or display strip located in the segment or display bus. In this approach each side of a row has a dedicated display bus. The information to be sent to a particular display module or display strip is determined by the address code affixed to the information by the BUSM 39. Since each side of a shelf row is independently connected to the BUSM 39, the number of address codes needed is limited to the number of display modules that can be assigned to a single side of a store row, i.e. to the display bus. The address codes can be repeated for each side of a store row, i.e. for each display bus. The BUSM 39 can determine to which shelf side and shelf row, i.e. to which display bus cable, the information is to be sent.

The number of address codes that are needed for the display modules on a particular side of a row of shelves can be found as follows. In a typical store there could be 10 to 16 rows of shelves. Each side of a shelf row consists of four-foot long shelf sections (or three-foot long sections depending on its location) of sub-shelves and each section has a shelf edge channel. There are typically 6 to 7 layers of these shelf sections from the top to the bottom of the shelf side and there can be up to 19 to 20 groups of shelf sections across the horizontal expanse of the side of a row. Also, there can be 4 to 6 items per shelf section. This implies that there can be as many as (20×7×6) or 840 separate items per side of a row. Consequently, no more than 1,024 separate address codes are needed for the display modules on a side of a row of the store shelves and consequently for each display bus. Each address code can be represented by a 10 bit binary (digital) word consisting of 1's and 0's. The address codes can be repeated on different rows of shelves since the BUSM can differentiate display modules with the same code by the particular shelf side and row in which the display modules are located. In addition, clock speed rates can be below 10 kHz for any particular display bus. The BUSM can send the display information simultaneously to all of the shelf rows using parallel processing. This allows the rapid change of displayed information throughout a store and will allow the use of low clock speeds. With this approach, the Part 15 FCC requirements for computing devices will not apply to that part of the electronic bus display system located between the BUSM and the rows of store shelves.

In that situation in which the number of items exceeds the maximum number of address codes in a particular side of a row (i.e. 1,024), the side can be partitioned. A separate display bus can then serve each of the two partitions. A similar address code approach also applies to the alternate embodiment which employs the display strips. However, shelf sections are frequently moved from one store row to another. Consequently, if a separate address code is assigned to all of the display strips used in a store, each display strip can remain attached to its particular shelf edge channel or shelf section. Since one display strip will be needed for each shelf section and since there can be 7 vertical layers of shelf sections and there can be 20 groups of shelf sections per side of a row, a total number of 140 display strips (7×20) will be needed for each row. In addition, there can be as many as 20 rows or 40 individual sides of store rows in a very large store; consequently, a total number of 5600 (140×40) display strips are needed. Based on these numbers, no more than 8,192 separate address codes are needed for the display strips and each address code can be represented by a 13 bit binary (digital) word consisting of 1's and 0's.

Figure 10:
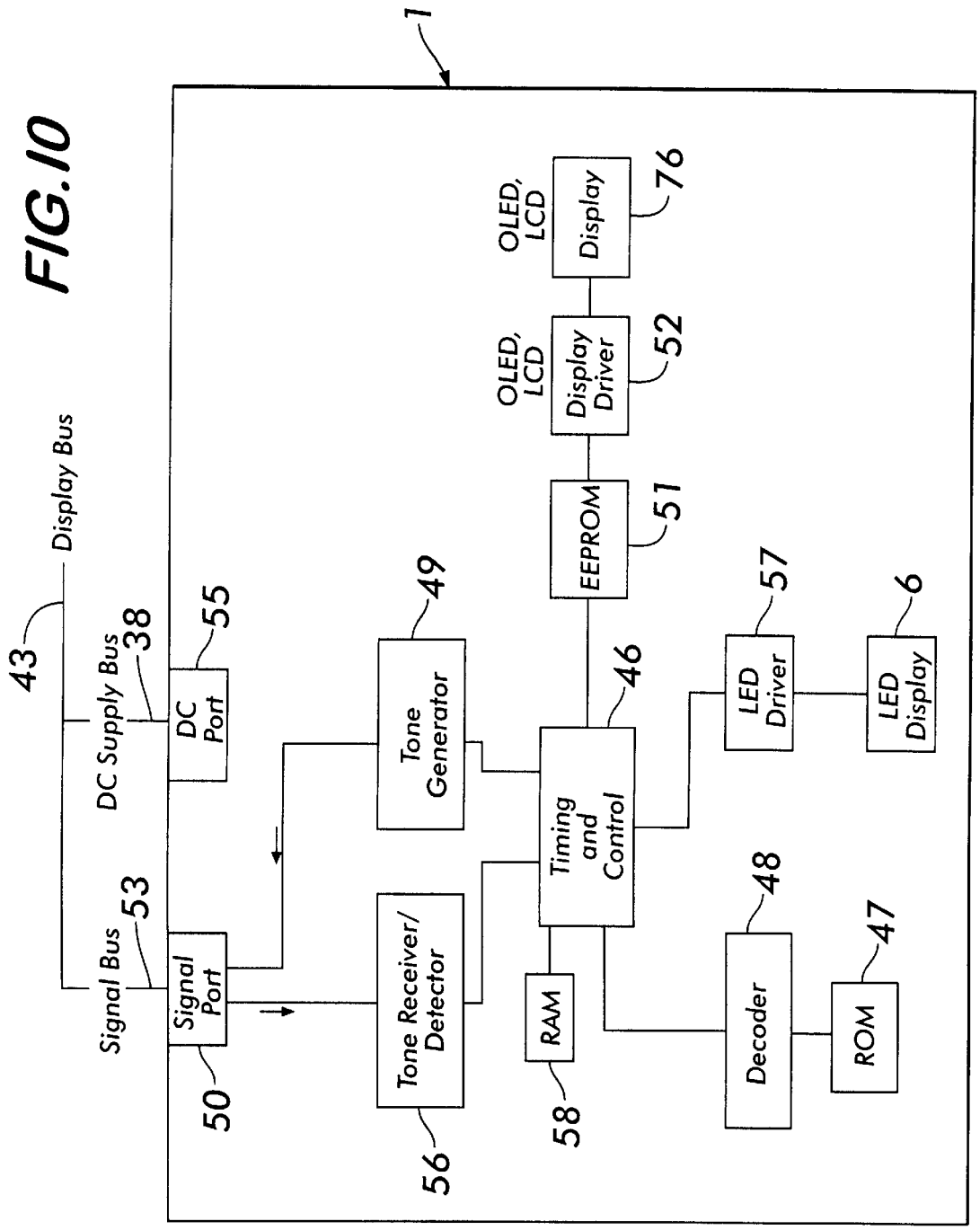
FIG. 10—is a block diagram of the display module showing its constituent electronic subsystems and its electrical connections to the display bus.

Referring now to FIG. 10, a block diagram of the electronic subsystems of each display module 1 is shown. The display bus 43 consists of both a DC supply bus 38 and a signal bus 53. Each display unit 1 has a signal port 50 and a DC port 55. The new product information is processed and received in the following manner. First, the BUSM sends out the 10 bit address code as a series of different frequency tones on the signal bus 53. In one such scheme one tone represents a digital "1" and a second tone of different frequency can represent a digital "0". The frequency tones are received, detected and converted to digital, (binary) signals by the Tone Receiver/Detector unit 56. The Timing and Control module 46 then compares the received address code signal to the internal code stored in its ROM 47 by the use of the Decoder 48. The RAM unit 58 consists of random access memory that the Timing and Control module 46 needs to process and route the information. If there is a match of address codes, an acknowledgment signal is then sent to the BUSM using the Tone Generator 49. Once the BUSM receives the acknowledgement signal, the BUSM then sends on the signal bus 53 the information to be displayed using the same two tone method of encoding address code information as described above. The display information, once received by the display module 1, is then sent to a nonvolatile programmable memory, EEPROM 51. This digital information is then sent to the Display Driver 52 and then to the Display 76 itself. Once the display information is received, it is resent to the BUSM as final check that the proper information has been received and displayed by the display module. The Display can use either liquid crystal devices (LCD) or organic light emitting devices (OLED). Special sales information is announced by the use of a flashing LED Display 6 and the LED Driver 57. This can be activated by receiving a special digital word sent by the BUSM using digitally encrypted tones. Once such transmission scheme is as follows. In the range of the allowable band of use, 11 kHz to 10 kHz, five tones can be selected, 1 kHz, 3 kHz, 5 kHz, 7 kHz, and 9 kHz. Each tone can be changed at a 1 kHz or 2 kHz rate. In one such embodiment, 3 kHz and 5 kHz can be used for address code transmission and 7 kHz and 9 kHz can be used for display information transmission. The 1 kHz tone can be used for activating the sales alert light 6. Certainly many other signaling schemes are possible.

Figure 11:
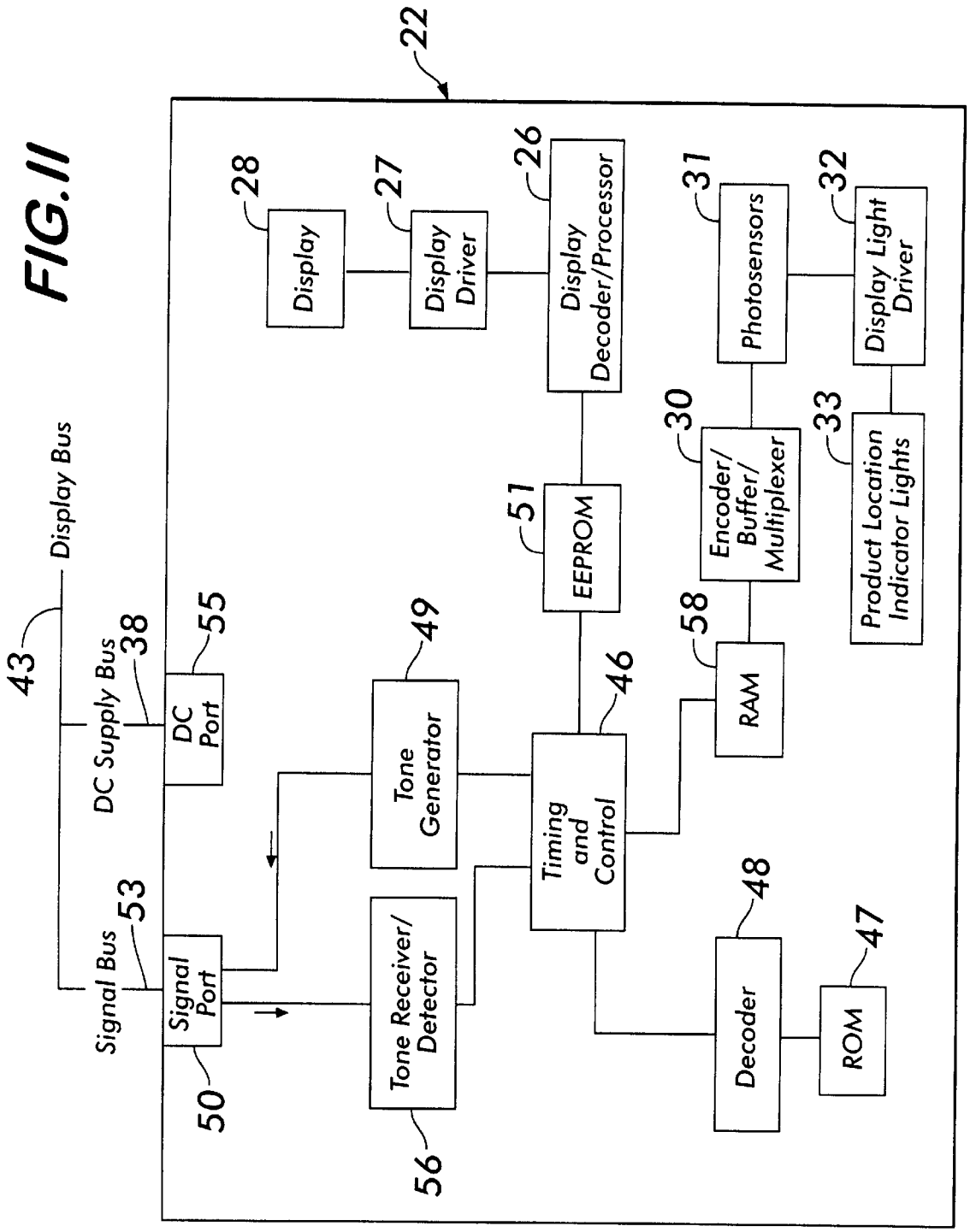
FIG. 11—is a block diagram of the display strip embodiment showing its constituent electronic subsystems and its electrical connections to the display bus.

Referring now to FIG. 11, a block diagram of the electronic subsystems that make up the display strip 22 embodiment is shown. It can be seen that the display strip 22 shares many of the same electronic components as the display module and these components perform the same functions as described previously with some additional functions described below. Like the previous embodiment which uses individual display modules, the display strip embodiment includes display bus 43, signal bus 53, supply bus 38, signal port 50, DC port 55, tone receiver/detector 56, tone generator 49, timing and control circuit 46, decoder 48, ROM 47 and EEPROM 51. Since the display strip 22 consists of distributed display segments and/or pixels, display information will require the transmission of more display information between the BUSM and the display strip than between the BUSM and the display module. The display decoder/processor 26 controls the display 28 and allows the proper location and product display information to be displayed across the face of the display strip 22. The display decoder/processor selects the correct pixels or segments in the pixel field or grid to form the correct alphanumeric display information. The display driver 27 activates the selected pixels. The display driver 27 provides the power to each of the appropriate display segments or pixels and is more complex than the display driver used with the display modules. The photo sensors 31 are used to detect the infrared or optical energy from the portable, hand-held device described previously and is used by store personnel in the initial set-up of products on the store shelf section. The photo sensors 31, when illuminated, activate the display drivers 32 for the corresponding product location indicator display lights 33. In addition, the illuminated photo sensors 31 send associated signals to the encoder/buffer/multiplexer unit 30. The encoder/buffer/multiplexer unit 30 conditions the signals from the photo sensors 31, digitally encodes the locations of the particular photo sensors that were illuminated out of the total photo sensor array strip 23, multiplexes the various encoded signals into a single digital string and stores the information in the RAM 58 unit. The display strip then sends this display location information to the BUSM when commanded by the BUSM.

Thus, the main processor (BUSM) includes means to detect a multiplex signal received by the display strip which includes the location of the sensor along the display strip where the multiplex signal was received as well as other information transmitted to the display strip sensor. The BUSM further includes a means to process this multiplex signal from the display strip such that information previously displayed on the strip may be changed in size or moved from one location to another. Since a multiplicity of sensors are included along the display strip, indicator means such as an illuminating LED shows the store personnel using the hand-held electronic control device the position of the operative sensor and hence the locational information provided to the main processor. The indicator light also confirms reception of light signals transmitted from the hand held electronic control device.

The second alternate display strip embodiment shares the same electronic subsystems as the first alternate display strip and these subsystems perform the same functions as described previously with exceptions as described herein. Referring now to FIG. 11, item 31 is a single photo sensor and item 33 is a single indicator light. The photo detector sensor 31 receives coded optical/infrared signals and sends these signals to the encoder/buffer/multiplexer unit 30. The optical/infrared signals can contain either product location information or product bar-code, UPC, information. The encoder/buffer/multiplexer unit first decodes the signal stream, then encodes and multiplexes the signals, and stores these signals in the RAM 58 in the proper sequence and signal configuration for transmission to the BUSM. Upon successful reception of an optical signal, the encoder/buffer/multiplexer unit 30, sends a signal to the indicator light driver 32 to allow the indicator light 33 to be momentarily activated. This acts as an acknowlegement signal to the floor operator that the transmitted signal was successfully received. The encoder/buffer/multiplexer unit 30 also sends a signal to the timing and control unit 46 via the RAM unit 58 to mark/denote the reception of new and updated product code and/or product location information. This allows the display strip unit 22, upon command by the BUSM, to send a signal to the BUSM to denote that new product code and/or product location information has been received by that display strip unit 22.

A further object of the present invention is to provide a system in which the display module or display strip is as simple electronically as possible. A major drawback of the prior art has been the complexity and resulting expense of the display modules. Tens of thousands of these items may be needed to instrument all of the items in a store. The current design extends the state-of-the-art by requiring the use of a display module or display strip that is extremely simple and inexpensive. This is accomplished by the unique design imbedded in the electronic BUSM system that interfaces with the store central computer and the display modules or display strip. The BUSM acts as a data buffer, information server, driver, and multiplexer and has been designated as the BUSM which is an acronym for Buffer, Server, and Multiplexer. Each store item and information to be displayed is stored in the store main computer. Upon initiating a change to the displayed information of a particular item, the store computer sends the new display information to the BUSM over one of its standard high-speed interface buses (serial or parallel). The BUSM has product information stored in its memory (designated 59 in FIG. 12). Included in this information is the particular row and side of the store shelves where an item is located and the internal address code of the item. The BUSM stores the product change information from the store computer and processes it. It decodes the information to determine the row and side locations of the item to be changed. It then routes the information to the correct data line or cable that is connected to that particular side and row, i.e., the correct display bus. It then sends the new information to the display module or display strip by using its particular address code.

The signal from the BUSM to the display module or display strip is a low frequency signal comprised of a series of tones with frequencies less than 10 kHz. The signal format between the BUSM and display modules or display strips can also be modulated tones, pulsed tones, or switched tones. In either case, the tones, pulse rates or switching rates in combination must be less than 10 kHz. In this manner the part of the new system from the BUSM to the display modules or display strips does not need to meet the Part 15 FCC requirements for computing devices. This part of the overall system includes the cables or data lines that are networked in the store, the display modules or display strips, and the printed circuit board buses.

Whichever of the above signaling systems is employed, the display modules and display strips require the same type of signaling system as the BUSM. The BUSM, after sending a signal with the new display information, waits for a confirmation or acknowledgment signal from the display module or display strip. In this manner there is an interaction between them. The BUSM keeps track of all the successful and unsuccessful transfers of information to the display modules and display strips and sends a report back to the store computer. In this manner, any potential display module or display strip failures or maintenance problems can be reported to the store computer for action to be taken later. The BUSM sends all changes to the display modules and display strips one at a time for a particular side of a row until all changes to that side have been completed. The BUSM performs this operation simultaneously for all of the sides of all of the rows. In this manner, all display buses are being processed and changed in parallel at the same time. This reduces the amount of time it takes to change all of the designated display modules and display strips in the store. The total change process is not complete until the BUSM has received acknowledgment signals from all of the display modules and display strips that had to be changed. The BUSM is programmed to attempt a display change in a limited number of tries. If no acknowledgment signal is received from the addressed display module or display strip within the limited number of attempts, then the display module or display strip is flagged as having a potential malfunction. The BUSM then signals the next display module or display strip to be changed until all of the display modules or display strips to be changed have been addressed. This approach limits wasted processing time. The detailed block diagram of the electronic subsystems that constitute the BUSM is shown in FIG. 12.

Figure 12:
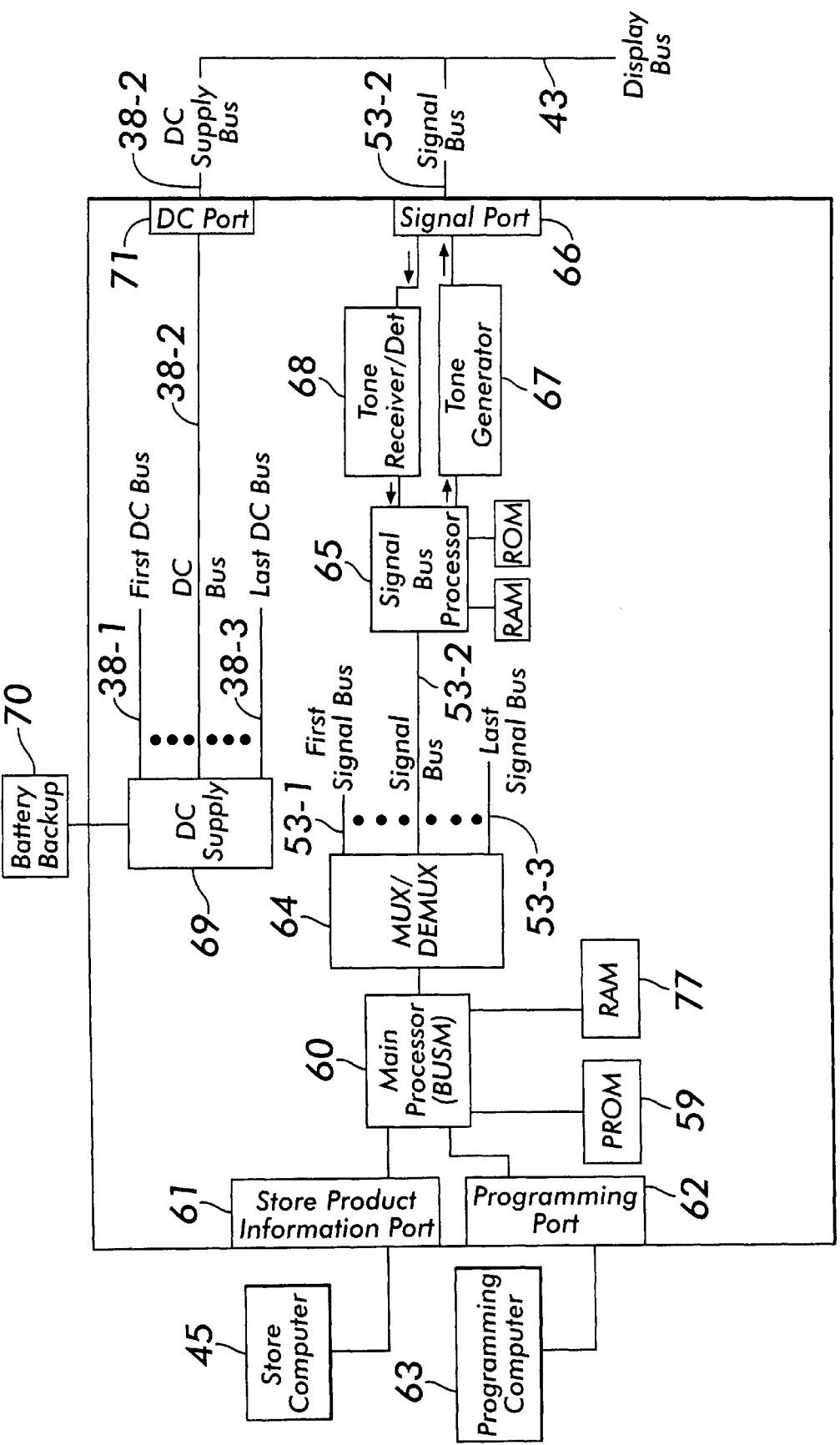
FIG. 12—is a block diagram of the BUSM showing its constituent electronic subsystems and its electrical connections to the signal and DC buses, the store computer, and a programming computer.

Referring now to FIG. 12, the BUSM has a Main Processor 60, a Programmable Memory (PROM) 59, and a RAM unit 77 that has random access memory needed for processing information. The Main Processor 60 receives the information to be changed from the store computer 45 through the Store Product Information Port 61. There is also a Programming Port 62 to allow access to the BUSM from a separate Computer Programming Workstation 63. The Programming Port 62 is used to enter product location information and product address code information into the PROM 59 unit of the Main Processor 60. The information loaded into the BUSM Processor 60 includes the particular side and row that an item is located. This information must be updated every time a new item is added, an existing item is moved to a different side of a row, or a display module with a different address code is to be used with the item. Software is needed to allow communication between the Programming Computer Workstation 63 and the Main Processor 60. In this way the Main Processor 60 can send the product information to the correct display bus 43. The particular address code of the product is also loaded into the processor memory, PROM 59. The address code of a particular product is dependent upon which of the 1,024 different display codes and its associated display module is to be used with the product. This decision is arbitrary but once selected and defined it will always be associated with the particular product on that side of the row unless changed by the store. The particular side and row a product is located is totally at the discretion of the store. Once product information is received by the Main Processor 60 from the store computer 45, it can encode the information with the proper signal bus address such that the MUX/DEMUX unit 64 can send it to the correct signal bus 53-1, 53-2, or 53-3. The MUX/DEMUX unit 64 performs a multiplexing operation by receiving information from the Main Processesor 60 and sending it to the correct signal bus 53 using the signal bus address code affixed to the information. Similarly, information sent from the Signal Bus Processor 65 to the Main Processor 60 is de-multiplexed into a single serial information stream to the Main Processor unit 60. Each display bus 43 receives the address codes of the display modules to be changed as well as the information to be changed for each display module. Each signal bus 53 has its own Signal Bus Processor 65. The Signal Bus Processor 65 stores the display codes and product information and then processes it. It first sends out address information using the two-tone encoding technique described earlier and then sends out display information in the same manner. The Signal Bus Processor 65 sends information over the signal port 66 using the Tone Generator Module 67 to generate the proper set of tones. Once the display address is sent out and an acknowledgement signal is received, the display information is sent to the display module. The display module then retransmits the received information to the Signal Bus Processor 65. The Signal Bus Processor 65 then compares the sent information to the received information as a means of validating the displayed information in the display module. The signal from the display module is received, detected, and converted to digital signals by the Tone/Receiver/Detector Unit 68. If there is a discrepancy in sent versus displayed information, the Signal Bus Processor 65 flags the display unit 1 and, sends a malfunction report to the Main Processor 60. The Main Processor 60 reports all successful and failed transmissions to the store computer 45 for future action. However, once a successful transfer of information to a display module has occurred, the next display module to be changed is then processed. In this manner, all display modules that are to be changed on a particular display bus 43 are processed. This operation is performed in parallel with all of the other display buses 43. The Signal Bus Processor 65 performs most of the signal processing and this allows the display module to have a minimum of complexity and hence low cost. The signaling scheme of the Signal Bus Processor 65 must be identical to that of the display module and hence will use frequencies and data rates less than 10 kHz.

The interaction and information exchange between the BUSM and the display strips is very similar to that described previously for the display modules with the following exceptions. In order to communicate with a particular display strip, the BUSM sends out a signal that can contain one of 8,192 possible display strip addresses. The BUSM is pre-programmed with the address codes of the display strips used in the store and is pre-programmed with the display bus 43 locations of all of the display strips. As with the display modules, the BUSM establishes communication with a display strip by sending out its address code over the particular display bus 43 on which it is located, that is, the particular side of a store row in which the display strip is located. There is a separate address code for every display strip used in a store. Locating a display strip and its corresponding shelf section when it has been moved to another row can be achieved by transmitting its address code to each side of the store rows in the store, that is, to each display bus 43, one at a time until a response has been obtained. The new location can then be stored in the RAM unit 77 of the BUSM. The display information sent between the display modules and the BUSM equally applies to the display strip. However, the BUSM also receives from the display strip product location information for the different products located on the shelf section. This is accomplished by the BUSM sending a signal requesting product location information. The main processor 60 of the BUSM then decodes this information to determine those photo sensor elements of the display strip that were illuminated. In this manner the location and boundaries of products on a shelf can be determined. This process is performed only during initial product setup and whenever the product locations on a shelf section are changed. This information is used by the main processor 60 of the BUSM in developing the proper display information for each product including display width and height and the location of the information to be displayed on the display strip. The display information processed by the BUSM is encoded to match the signal format of the decoder/processor of the display strip to ensure that the correct information is displayed. As with the display modules, the BUSM has pre-programmed product display information for each display strip and pre-stored information on the type and number of products on the particular shelf section associated with each display strip.

The interaction and information exchange between the BUSM and the second alternate display strip embodiment is very similar to that described previously for the first display strip embodiment with the following exceptions. In addition to its usual functions such as sending updated product information to the display strips as it is received from the store computer, the BUSM will have to continuously interrogate/poll all of the display strips to determine if new product code/location information has been received by the display strip from the handheld electronic control unit. Once the BUSM has determined that new information has been received by the display strip, it can command the display strip to send this new information to it. Upon reception of this information, the BUSM can use the received UPC information as an address code to locate the item cost and product description information stored in its main processor under that particular address. The BUSM then processes this product information along with the new product location information that was received, to develop the proper display information for each item including display width and height parameters and the location of the information to be displayed on the display strip. This information is processed and encoded for correct transmission to the display strip in much the same manner as other transmissions to the display strips. In this manner all of the display strips can be updated in a correct and timely fashion.

The BUSM also has a DC power supply 69 which provides power to all of the display modules and display strips through DC Port 71 to the DC Supply Buses 38-1 to 38-3. All display modules and display strips have a non-volatile memory (EEPROM) that will retain the display information in the event of a power failure. However, a Battery Backup 70 can be included which can provide power to the DC Supply Buses during a power failure.

Figure 13:
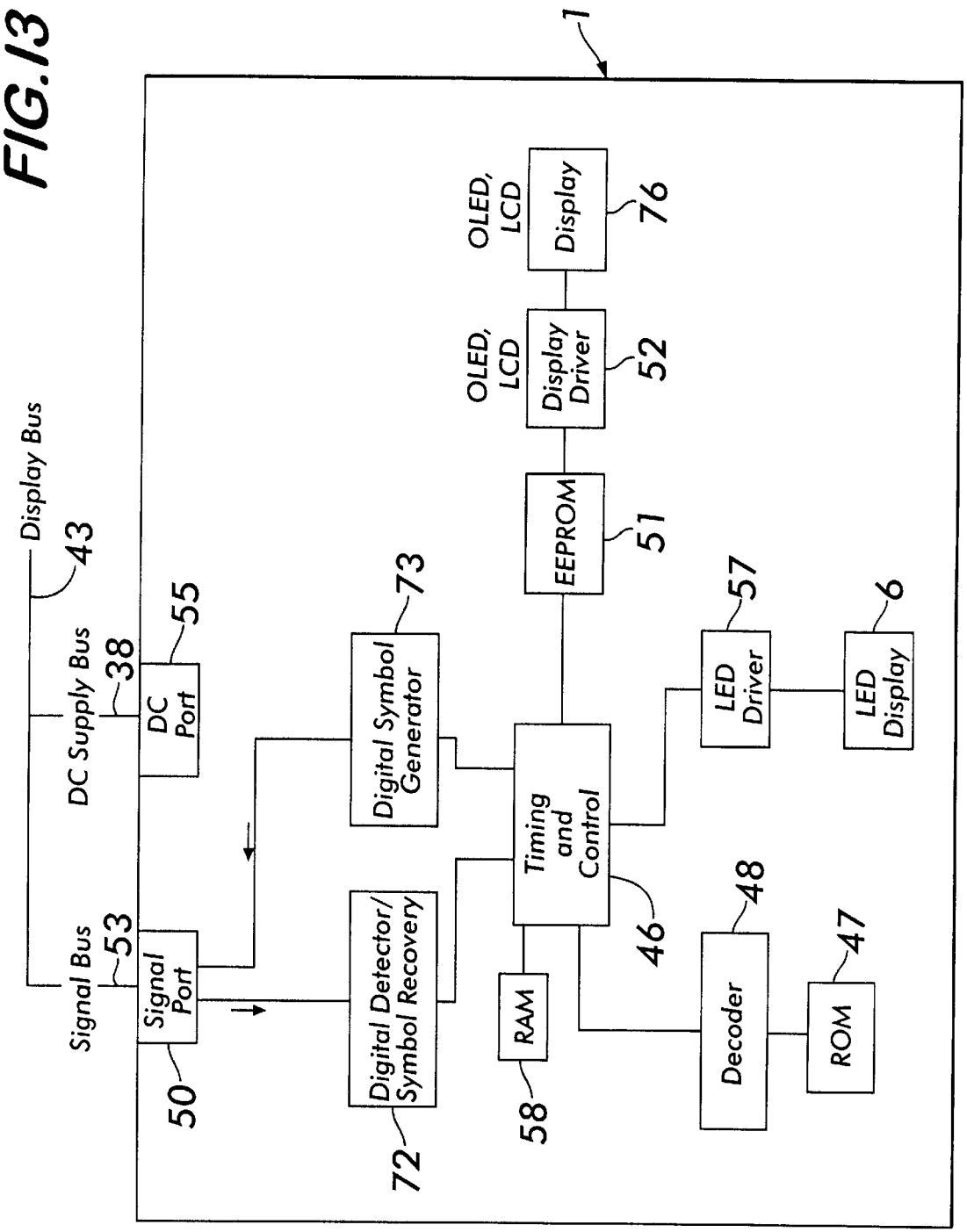
FIG. 13—is a block diagram of the display module showing its constituent electronic subsystems when conventional digital signals are used in the signal bus.

FIG. 13 is a block diagram of the electronic subsystems of the display module 1 using standard digital signals on the signal bus 53 as an alternate signaling method. Only two modules are different from those described previously, the Digital Detector/Symbol Recovery module 72 and the Digital Symbol Generator 73. The Digital Detector/Symbol Recovery module 72 detects the presence of binary signals on the signal buses 53-1 to 53-3 through the signal port 50 and reconstructs or recovers the transmitted digital signal and sends the signal to the Timing and Control module 46. The Digital Symbol Generator module 73 contains digital signal generation and drive circuits and produces digital signals for transmission over the signal buses. All other subsystems operate as described previously and the numbering of the various components correspond to the same components as shown in FIG. 12. A similar block diagram can be generated for the display strip using standard digital signals on the signal buses.

Figure 14:
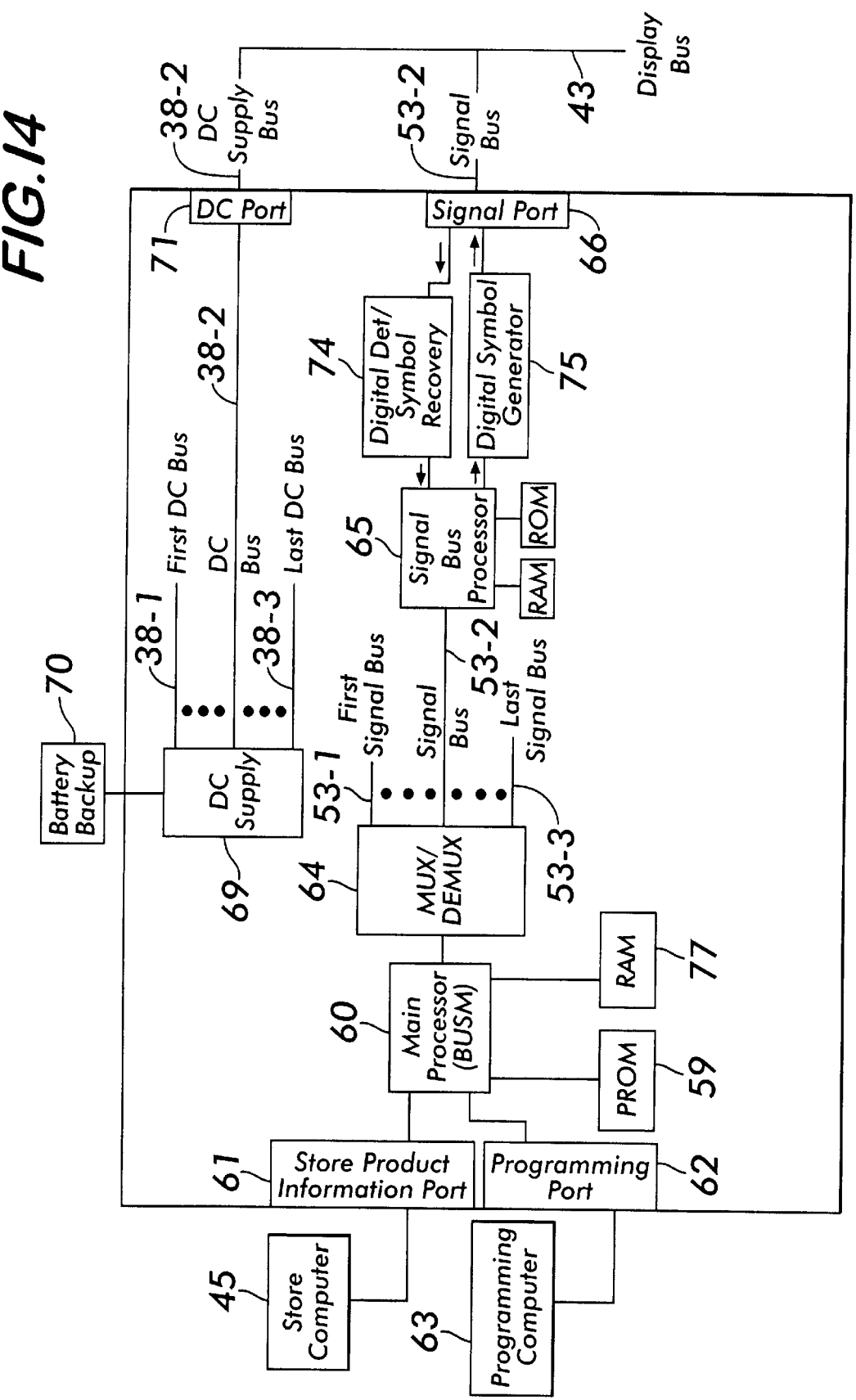
FIG. 14—is a block diagram of the BUSM showing its constituent electronic subsystems when conventional digital signals are used in the signal bus.

FIG. 14 is a block diagram of the electronic subsystems of the BUSM unit 39 using standard digital signals on the signal bus 53. Only two of the modules are different from those described previously, the Digital Detector/Symbol Recovery Module 74 and the Digital Symbol Generator Module 75. These two modules function in the same manner as those for the display module as described above in FIG. 12. All other subsystems operate as described previously and the numbering of the various components correspond to the same components shown in FIG. 12.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. An integrated electronic display, comprising:
   a display strip for electronically displaying sales item data provided in updateable form by a computer, said display strip located along a store shelf having a plurality of designated display locations each having a display location address code in said computer, comprising:
   display grid elements distributed uniformly across the display strip to form illuminated alphanumeric characters;
   sensor means lying along the length of said display strip and across a boundary between laterally adjacent display locations for receiving light signals from a remote hand-held programming device, said sensor means being selectively activateable by said hand-held device at identifiable points along said sensing means indicative of said display location;
   transmitter means connected to said sensor means for programming said computer designated display location address codes; and
   receiver means for processing display signals from said computer to display alphanumeric characters at designated display locations across the face of the display strip as programmed by said hand-held device.

2. The apparatus of claim 1 further including a tone frequency receiver and tone frequency detector for receiving message data transmitted by said computer.

3. The apparatus of claim 2 further including timing and control logic coupled to the tone detector for routing, transferring and controlling received message data by said tone detector.

4. The apparatus of claim 3 further including a random access memory coupled to said timing and control logic for storing message data from the computer.

5. The apparatus of claim 4 further including a read only memory for storing the address code of said display strip.

6. The apparatus of claim 5 further including a decoder coupled to said read only memory being adapted to determine if address code stored in the read only memory is contained within the message received from said computer.

7. The apparatus of claim 6 further including contact means for electrically connecting said display strip to electrical power and signal buses.

8. The apparatus of claim 7 to a further including means for mounting said display strip to a sale item shelf.

9. The apparatus of claim 8 further including:
- a non-volatile semiconductor memory coupled to said timing and control logic for storing the item data provided by said computer when said local address code matches said transmitted address code and for retaining such item data even in the absence of external power;
- a display driver and display processor coupled to said non-volatile memory for electronically displaying item data provided by said computer; and
- a tone frequency generator coupled to said control and timing logic for generating and transmitting display strip multiplexed sensor information to said computer.

10. The apparatus of claim 1, further including a plurality of indicator means on said display strip for confirming reception of said light signals and for indicating the physical location of the sensor activation points.

11. An electronic interface device that receives item data information from a main computer, retains and processes the item data including item address codes and transmits said sales item data to display devices comprising:
- a plurality of sales item display strips located adjacent respective sales items, comprising:
  - display grid elements distributed uniformly across the display strip to form illuminated alphanumeric characters;
  - sensor means lying along the length of said display strip and across a boundary between laterally adjacent items for receiving light signals from a remote hand-held programming device;
  - transmitter means connected to said sensor means for programming said computer designated item address codes; and
  - receiver means for processing display signals from said computer to display alphanumeric characters at designated locations across the face of the display strip as programmed by said hand-held device;
- an item information input port for receiving item data from a main computer;
- a programming input port for receiving item information data including location, item address code of the display device associated with a specific item, signal bus address of the item display device, and item signature data;
- a main processor coupled both to said item information input port and a programming input port for processing said item signature data and said item information data;
- a programmable memory coupled to said main processor for storing item signature data including universal bar codes, signal bus addresses, and item addresses;
- a random access memory coupled to said main processor for temporary storage of processed information;
- a multiplexer/demultiplexer unit coupled to said main processor for routing, distributing, and transferring item data information to and from the main processor; and
- a plurality of signal bus processor units coupled to the multiplexer/demultiplexer unit for processing, storage, transmission and reception of item data information to and from item display devices through signal buses, and to and from the main processor.

12. The electronic interface device of claim 11 wherein said sensor means comprises a plurality of photosensors and said identifiable points along said sensing means are determined by which photosensors are illuminated by said remote hand-held programming device.

13. The electronic interface device of claim 11 wherein said light signals contain information designating locations of products along said display strip and information designating the identification of products, said location information being derived from a measuring scale on the top surface of the display strip.

14. The apparatus of claim 11, further including a plurality of indicator means on said display strip for confirming reception of said light signals and for indicating the physical location of the sensor activation points.

15. The apparatus of claim 11 wherein said main processor includes means to detect a multiplex signal received from the display strip, said signal containing information including the location of the sensor means from which the signal was received.

16. The apparatus of claim 15 wherein said main processor includes means to process said multiplex signal from the display strip such that displayed information on the display strip may be changed in size and moved from a first location to a second location.

17. The apparatus of claim 16 wherein said display strip includes a multiplicity of sensors and said main processor includes means to relocate said display information on the display strip to a location adjacent to one of said sensors from which said multiplex signal was received.

* * * * *